J. L. OGDEN.
TIRE.
APPLICATION FILED FEB. 21, 1918.

1,283,874.

Patented Nov. 5, 1918.

Inventor
J. L. Ogden
By Hurd Sutherland
Attorney

UNITED STATES PATENT OFFICE.

JESSE L. OGDEN, OF CHICAGO, ILLINOIS.

TIRE.

1,283,874.

Specification of Letters Patent.

Patented Nov. 5, 1918.

Application filed February 21, 1918. Serial No. 218,564.

*To all whom it may concern:*

Be it known that I, JESSE L. OGDEN, a citizen of the United States, residing at Chicago, in the county of Cook and State of Illinois, have invented certain new and useful Improvements in Tires, of which the following is a specification.

This invention relates to tires. While a tire involving the invention is susceptible of general use, it is primarily adapted for use in conjunction with automobiles whether of pleasure or truck type. I have several motives in view, probably the first being the construction of a tire by which all the advantages of one of pneumatic character are secured without, however, the use of compressed air as a cushion or to maintain the tire in working condition. I provide a tire by which the requisite resiliency is obtained by the employment of a relatively reduced number of parts, the construction being simple, highly efficient and susceptible of production at a low cost. There are other features of novelty and advantage which with the foregoing will be stated at length in the following description wherein I will set forth in detail that form of embodiment which I have selected for illustration in the drawings accompanying and forming part of the present specification. I do not, of course, limit myself to this particular disclosure; I may depart therefrom in several respects within the scope of the invention defined by the claim following said description.

Referring to said drawings.

Like characters refer to like parts throughout the several views which are on different scales.

Figure 1:
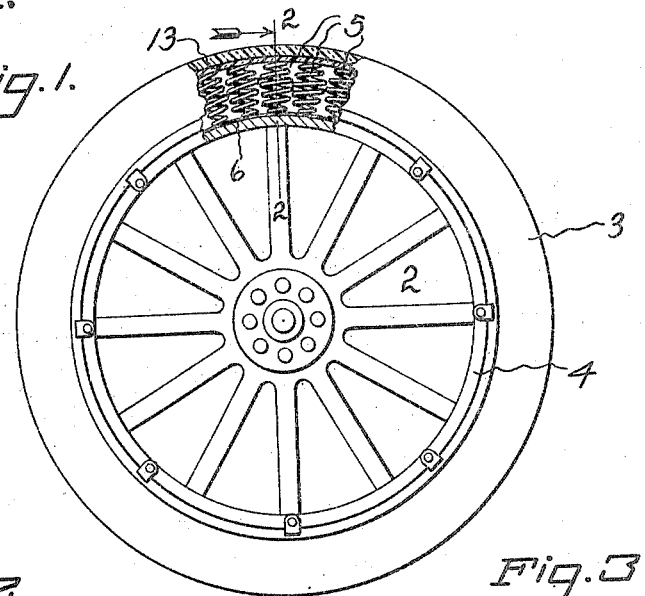
Figure 1 is a side elevation partly in section of a wheel equipped with a tire involving the invention.

The tire may be associated with any suitable wheel as will be understood; that shown is denoted in a general way by 2 and is supposed to be the familiar wood one. The tire involves in its make-up a suitable casing such as that denoted in a general way by 3, being of rubber or other suitable material; it is detachably mounted in some convenient manner upon the felly 4 of the wheel. The tire casing 3 is of circular form after the custom and it is virtually of U or pear-shape in cross section. Within the tire are disposed a suitable number of coiled springs 5 ordinarily of compression type, and hereinafter described. I might note at this point, however, that the springs in the aggregate are arranged in annular form around the felly 4.

The tire casing 3 fits against the band 6 having at one side the outstanding flange 7 turned outwardly along its free portion as at 8 so as not to engage the casing. The opposite edge portion of the band 6 is furnished with an inwardly extending circular bead 9 having an annular groove 10 in which is sprung the inner edge portion of the ring 11 complemental to the flange 7. This ring and flange jointly grip between them in a substantial manner the inner portion of the casing. As will be clear the ring is divided and resilient, so that it can be opened out and then sprung into said groove or channel. Said ring has an outturned portion or lip 12 mating with the outturned portion 8 to which I have already alluded.

Figures 2, 3, 4:
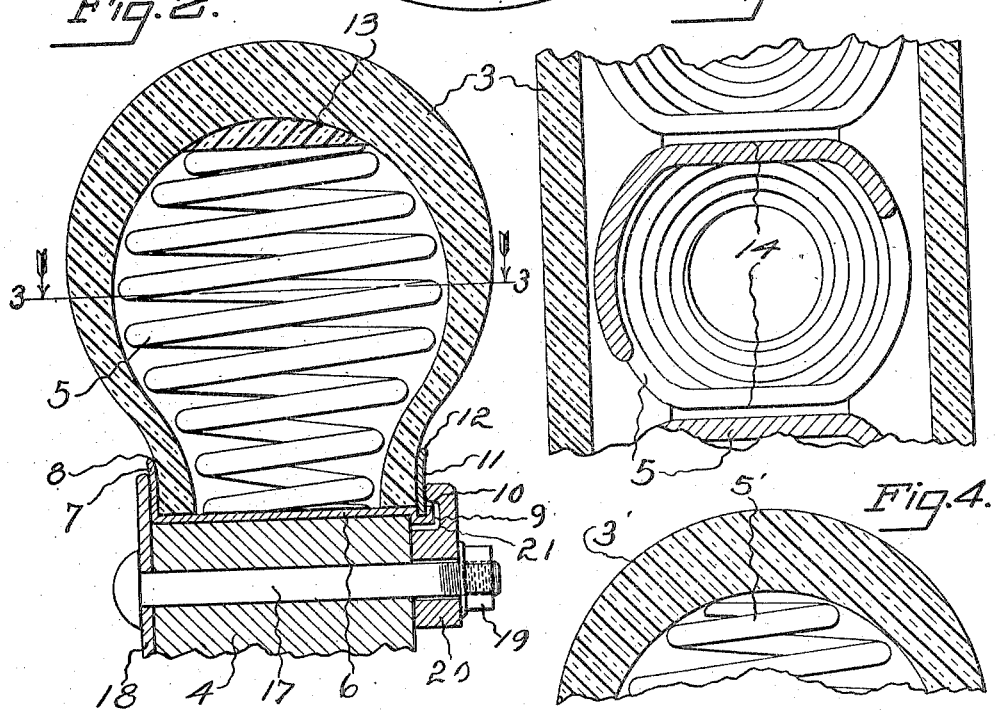
Fig. 2 is a transverse section on the line 2—2 of Fig. 1, looking in the direction of the arrow.
Fig. 3 is a longitudinal section on the line 3—3 of Fig. 2, looking in the direction of the arrow.
Fig. 4 is a detail in cross section of a modification.

The springs 5 are closely arranged circumferentially of the felly 4 and band 6, yet they are not in contact with each other although still rather close. In longitudinal section transversely of the tire they are virtually of pear-shape so as to approximately agree with the interior formation of the tire casing, and this means that the casing itself will limit the side motion of the springs which is a feature of advantage. The inner ends of the several springs fit against the band 6; their outer ends fit against the filling piece 13 which is within the casing and fits against the outer side of the interior thereof. In Fig. 4 I have shown this condition wherein the springs 5' directly engage against the tire casing 3'.

The front and rear portions of the springs 5 are flattened as at 14, the flattened portions of the respective springs being in proximity with each other circumferentially of the band 6 and felly 4. By having the springs practically fill the interior of the tire casing transversely thereof it is clear that lateral movement of the springs is effectually prevented even though the springs do not directly engage the casing. By flattening them on their front and rear portions or in a direction corresponding with the circumference of the casing, they are likewise effectually prevented from moving circumferentially, in view of which facts no extraneous means is necessary to maintain the springs in operative relation. This is an important advantage; that is to say the casing itself prevents sidewise motion and the springs mutually prevent circumferential motion thereof. To properly seat the springs their end portions are flattened as shown for instance by Fig. 2.

The casing 3, the inclosed springs 5 and band 6 when assembled practically as thus far described constitute a unitary structure which can be mounted upon and dismounted from a wheel as a unit. The band 6 when equipped practically in the manner described is suitably fitted to the felly 4 of the wheel, the band surrounding said felly and the bead overhanging the same with its inner surface abutting solidly against the outer face of said felly to aid in holding the parts secure and in proper relation with each other.

The felly 4 as shown is transversely perforated for the passage of bolts as 17 which extend through perforations in the ring or band 18 fitted against one side of the felly, the heads of the bolts abutting against the outer face of said ring or band. The overhanging portion of the latter presents a wall to be abutted by the flange 7. The threaded portions of the bolts 17 receive nuts as 19. Between said nuts and the felly are interposed clamping members as 20 perforated for the passage of the respective bolts, the clamping members being apertured as at 21 to receive the beaded portion 9 of the band 6. Said clamping members 20 abut against the ring 11, the result being that when the nuts 19 are set and when the parts are assembled in the manner set forth, the tire will be held in proper and firm relation with the wheel.

I have referred to the fact that I may dispense with the filling piece 13 and have shown how this is accomplished. In some cases it may be made integral with the casing 3.

What I claim is:

A tire comprising a casing, the interior of which is practically of pear-shape in cross section, and coiled springs arranged within the casing, the springs in longitudinal section and transversely of the casing conforming approximately to the cross section of the interior of the casing, the lateral portions of the convolutions of the springs being curved and contiguous to the interior of the casing to thus prevent side movement of the springs and the portions of the springs circumferentially of the casing being flattened and contiguous respectively with each other to thus prevent movement of the springs circumferentially of the casing, the casing supporting the outer ends of the springs and being removable as a unit from a felly with the springs contained therein.

In testimony whereof I affix my signature in the presence of two witnesses.

JESSE L. OGDEN.

Witnesses:
WILLIAM F. GLEASON,
J. T. MAMMOSER.

Copies of this patent may be obtained for five cents each, by addressing the "Commissioner of Patents, Washington, D. C."